Figure 3:
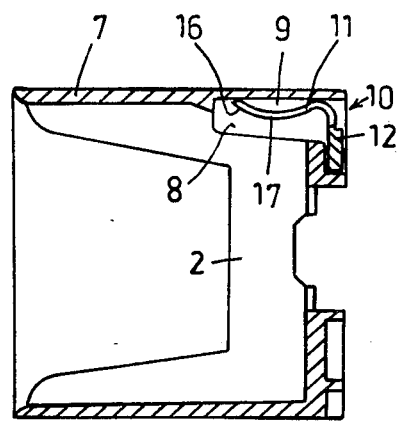

United States Patent [19]

Russell

[11] 4,141,631

[45] Feb. 27, 1979

[54] PHOTOGRAPHIC SLIDE MAGAZINE SPRING ASSEMBLY

[76] Inventor: Percy Russell, Unit 4, 30A, The Crescent, Dee Why, New South Wales, Australia

[21] Appl. No.: 755,814

[22] Filed: Dec. 30, 1976

Related U.S. Application Data

[63] Continuation of Ser. No. 608,893, Aug. 29, 1975, abandoned.

[30] Foreign Application Priority Data

Sep. 4, 1974 [AU] Australia .............................. PB8765

[51] Int. Cl.$^2$ ............................................. G03B 23/04
[52] U.S. Cl. ..................................... 353/116; 206/561
[58] Field of Search ................ 353/116, 117; 206/561; 40/79, 124, 63 R, 63 A, 64 R, 64 A

[56] References Cited

U.S. PATENT DOCUMENTS 2,900,074  8/1959  Windman ............................. 206/561
3,159,934  12/1964  Wiklund ................................... 40/79

FOREIGN PATENT DOCUMENTS 2321419  11/1974  Fed. Rep. of Germany ........... 353/116

Primary Examiner—Harry N. Haroian
Attorney, Agent, or Firm—James & Franklin

[57] ABSTRACT

A photographic slide magazine with an individual compartment for each slide has a spring arranged in each compartment protruding through the bottom of the compartment. The springs for all compartments are connected to a common strip and their free ends rest in a recess extending along the length of the adjacent wall of the magazine.

3 Claims, 4 Drawing Figures

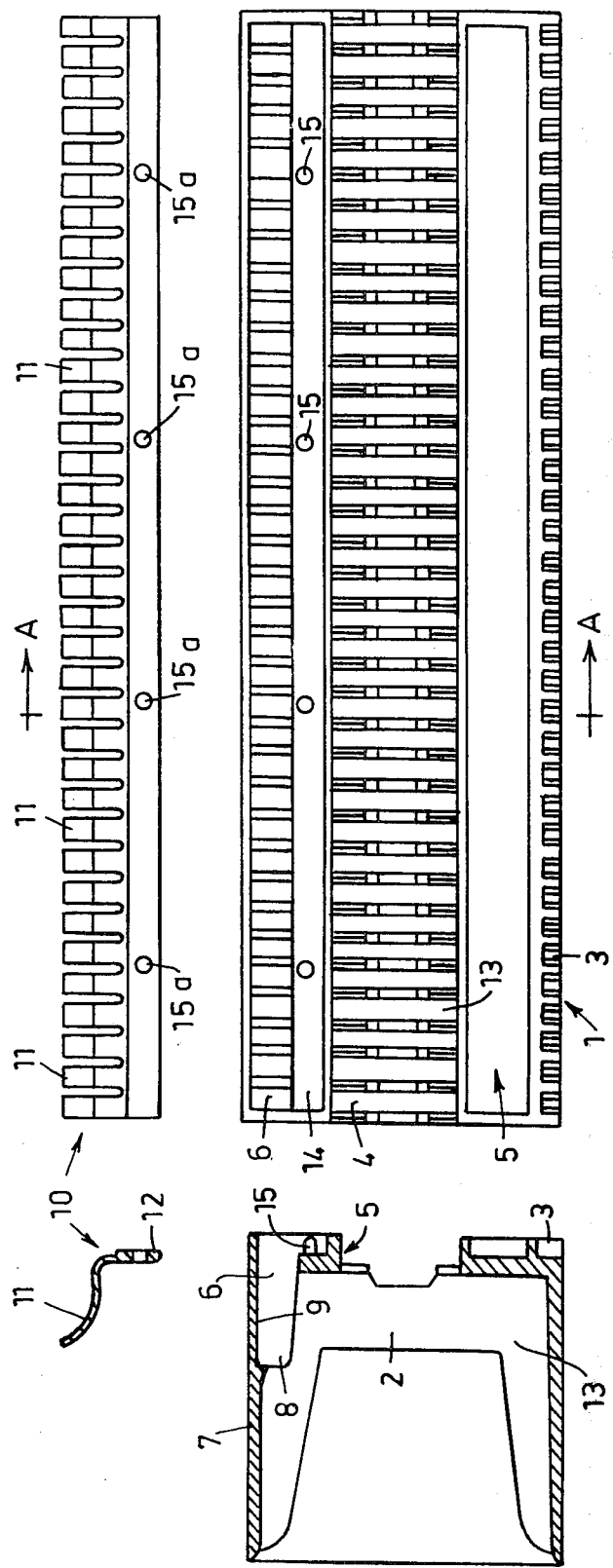

PHOTOGRAPHIC SLIDE MAGAZINE SPRING ASSEMBLY

This is a continuation of application Ser. No. 608,893, filed Aug. 29, 1975, now abandoned.

The invention relates to slide magazines and more specifically to photographic slide magazines incorporating retaining spring assemblies.

In known photographic slide magazines used with slide projectors the slides are loosely inserted in individual compartments provided in the magazine. In order to prevent vibration forces occurring during transit and also during slide projection it has already been proposed to provide spring fingers clipped over one longitudinal edge of the open side of the slide magazine and extending with their free ends into the magazine. These spring fingers are arranged in simple cantilever fashion, whereby a plurality of fingers extend from a common base member.

Although the spring fingers are adjusted to a certain tension to provide a predetermined friction on the inserted slides, it has been found that on account of their position near the longitudinal edge of the magazine and the cantilever type construction they are liable to damage during slide loading and operation of the slide magazines, which may lead to breakage of the fingers or changes in their preset tension.

It is an object of the invention to overcome this defect. This object is achieved according to the invention by a photographic slide magazine being open on one side and having individual compartments, each being adapted to receive a photographic slide therein, and a spring finger assembly mounted on the magazine wall opposite the open side of said magazine and having individual spring fingers extending through an elongated opening in said magazine wall extending through all compartments along an adjacent wall of the slide magazine, the free end of each spring finger resting in a recessed part in said adjacent wall bordering said opening.

Figure 4:
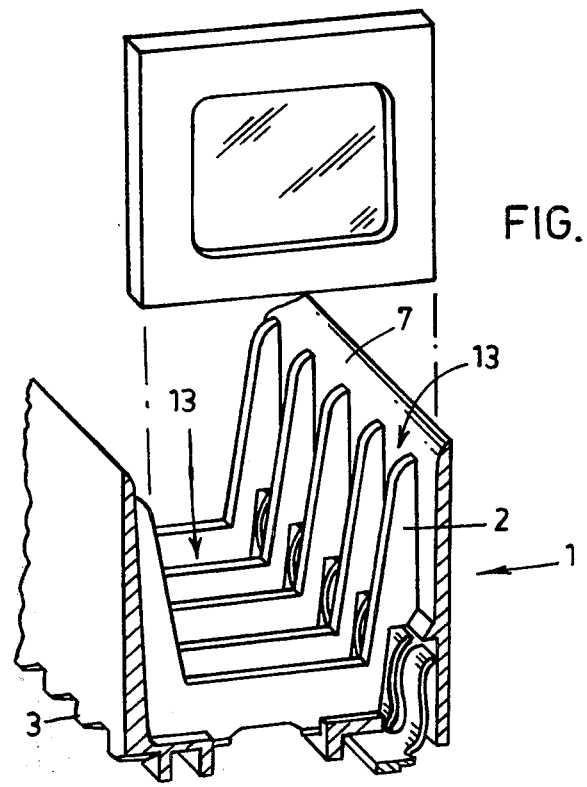

The invention will now be described in more detail in connection with one embodiment thereof as shown in the drawings, in which:

FIG. 1 shows an elongated box type slide magazine adapted to receive the spring assembly according to the invention and such a spring assembly detached from the magazine, FIG. 2 is a sectional view of magazine and spring assembly along line A—A of FIG. 1, FIG. 3 shows schematically the spring assembly of FIG. 1 as attached to the slide magazine of FIG. 1, and FIG. 4 is a perspective view of part of a box type slide magazine with a spring assembly attached thereto.

In this particular embodiment the photographic slide magazine 1 is of the linear or elongated box type. The main features of such magazines such as slide partitions 2, the tooth rack for magazine transportation 3 and the central slots 4 in the wall 5 opposite the open side of the magazine to allow entry of a slide pusher are well known and do not require detailed description. According to the invention, however, there is a further elongated opening 6 provided in said opposite wall 5 of the magazine adjacent the wall 7 of the magazine 1, which under normal operating conditions is the top wall thereof. This opening 6 extends the full length of the magazine 1 through all partitions 2, which thus have cut-outs 8 extending from the said opposite wall 5 of the slide magazine 1 inwardly in accordance with the width of a recess or rabbet 9 extending along the top wall 7 bordering the beforementioned opening 6.

A spring finger assembly 10 made from metal or plastic is mounted on the said opposite wall 5 of the slide magazine 1 so that the individual spring fingers 11 extend through the beforementioned opening 6 into the magazine 1.

This spring finger assembly 10 consists of a strip 12 having extending therefrom a plurality of spring fingers 11 of reduced thickness and spaced apart in accordance with the spacing of the partitions 2 in the slide magazine 1, so that one spring finger 11 is provided for each compartment 13 of the magazine 1. The strip 12 is mounted on the said opposite wall 5 of the magazine 1 in a longitudinal recess 14 by means of a number of pegs 15 projecting from the bottom of the recess 14 and fastened to said pegs 15 by swaging, heat sealing or other means, having corresponding holes 15a.

The spring fingers 11 are pretensioned in such a way that when the assembly 10 is mounted on the magazine 1 the end 16 of each spring finger 11 rests on the rabbet 9 in the top wall 7 and is thus protected against contact with an inserted slide and possible buckling thereby. The spring finger 11 itself is slightly bowed so that its bowed part 17 contacts the edge of an inserted slide and stops it from vibrating.

Each spring finger 11 has its free end 16 supported by the inside face of the top wall 7 and is able to slide inwardly along this face when the finger is deflected by a slide. Between the point of contact 17 of the finger 11 with a slide and the fixed end of the finger 11 is an outwardly bowed portion which is also able to deflect. This combination of sliding and deflection portions enables the generation of large enough friction forces to hold the slide without overstressing the spring so as not to lose its efficiency with repeated use.

The foregoing detailed description referred to a slide magazine of the elongated box type but it must be understood that a similar spring finger assembly can be combined with a rotating or carousel type slide magazine as known per se. In the latter case the spring fingers are part of a ring rather than a strip.

As mentioned above the spring finger assembly can be made from any suitable material and the said combination of sliding and deflecting parts enables plastic materials to give very satisfactory results.

I claim:

1. A photographic slide magazine comprising
    (A) a housing defining a plurality of compartments, each compartment adapted to receive a photographic slide therein, said housing having a rear wall, an open front, and at least one side wall connecting said rear wall and said front, said rear wall and said one side wall defining an elongated opening extending through all said compartments along said one side wall, and said one side wall defining in each of said compartments a recess of given depth communicating with said opening;
    (B) a spring finger assembly formed of plastic mounted on said rear wall and having individual spring fingers extending through said opening, each of said individual spring fingers being configured and dimensioned so that the free end thereof is at all times supported by and slidable along the bottom of an associated one of said recesses and an intermediate portion thereof extending into said compartments for engagement by a slide, said recess and finger configuration cooperating to preclude complete flattening out of said individual spring finger by an oversized slide.

2. A magazine according to claim 1 wherein said spring finger assembly consists of a strip of material having individual spring fingers extending therefrom in parallel spaced relationship.

3. The magazine according to claim 1 wherein said rear wall defines a longitudinal recess provided with spaced apart studs, and wherein said spring finger assembly additionally includes a strip of material secured to said studs, said individual spring fingers extending from said strip in parallel spaced relationship.

* * * * *